United States Patent

Um

[11] Patent Number: 5,854,657
[45] Date of Patent: Dec. 29, 1998

[54] DEVICE FOR PREVENTING ENTRANCE OF BACKLIGHT INTO OPTICAL VIEW FINDER

[75] Inventor: Kee Tae Um, Seoul, Rep. of Korea

[73] Assignee: LG Electronics, Inc., Seoul, Rep. of Korea

[21] Appl. No.: 578,086

[22] Filed: Dec. 27, 1995

[30] Foreign Application Priority Data

Dec. 27, 1994 [KR] Rep. of Korea ............... 37193/1994

[51] Int. Cl.[6] ........................................................ H04N 5/225
[52] U.S. Cl. ..................... 348/340; 348/341; 348/374; 396/358; 396/491; 396/492
[58] Field of Search ................................. 348/333, 334, 348/335, 340, 341, 344, 362, 363, 367, 373, 374, 376; 396/373, 384, 385, 386, 358, 447, 72, 463, 491, 492; 359/555, 872, 877; H04N 5/225

[56] References Cited

U.S. PATENT DOCUMENTS

| | | | |
|---|---|---|---|
| 3,654,844 | 4/1972 | Hampton | 95/42 |
| 4,757,387 | 7/1988 | Saito | 358/225 |
| 4,758,853 | 7/1988 | Celenze | 354/152 |
| 5,053,875 | 10/1991 | Ishii et al. | 358/222 |
| 5,101,275 | 3/1992 | Wijnen | 358/209 |
| 5,150,215 | 9/1992 | Shi | 358/209 |
| 5,218,441 | 6/1993 | Karcher | 358/213.18 |
| 5,233,197 | 8/1993 | Bowman et al. | 250/461.1 |

Primary Examiner—Wendy Garber
Assistant Examiner—Ngoc-Yen Vu
Attorney, Agent, or Firm—John P. White; Cooper & Dunham LLP

[57] ABSTRACT

Device for preventing entrance of backlight into an optical view finder for preventing degradation of an image, including a zoom lens part for adjusting a size and angle of an image signal of an objective in planning a picture frame, a mirror shutter part capable of opening and closing for sending the image signal processed in, and received from the zoom lens part to a first optical axis and a second optical axis, an image forming CCD part disposed at an image forming plane of the image signal of the zoom lens part on the first optical axis for converting the image formed on the first optical axis into an electric signal for applying the electric signal to a display or a recording medium, and an optical view finder part disposed on the second optical axis for adjusting a magnification of the image signal on the second optical axis by means of an internal optical system for being observed by an observer's eye.

3 Claims, 2 Drawing Sheets

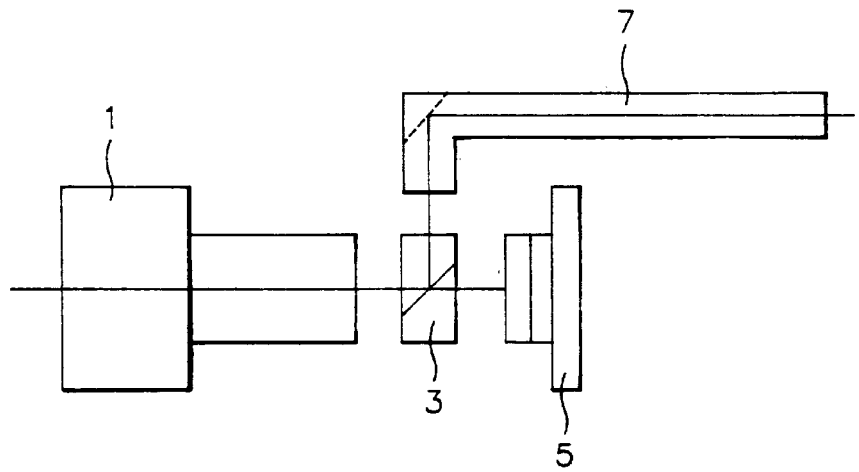
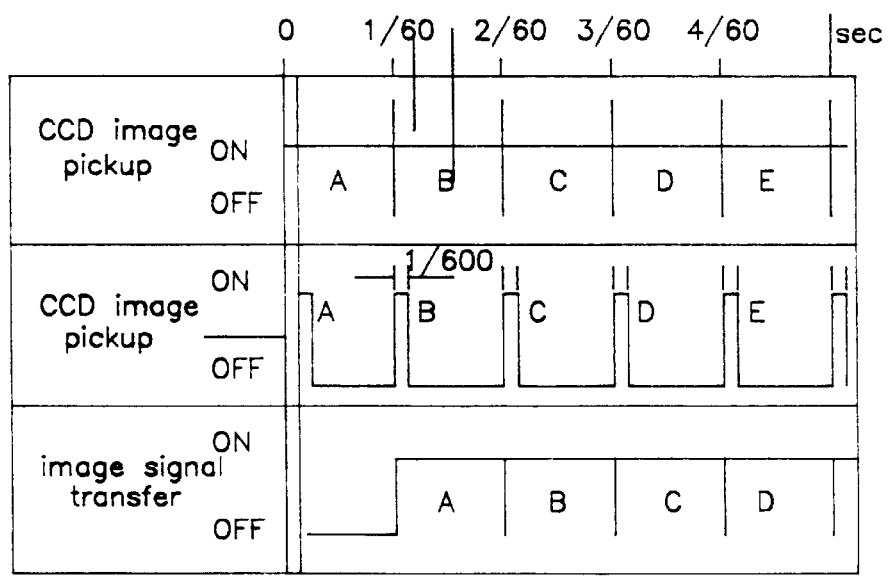

FIG. 3
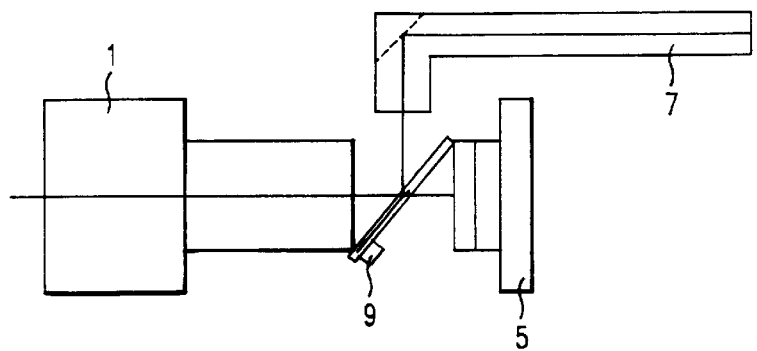
FIG. 4A
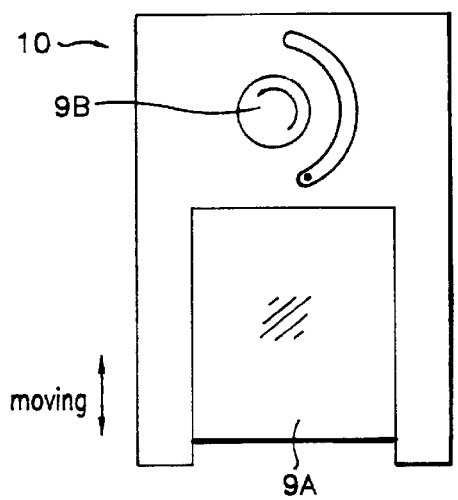
FIG. 4B
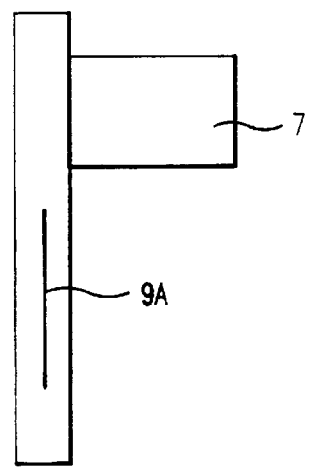
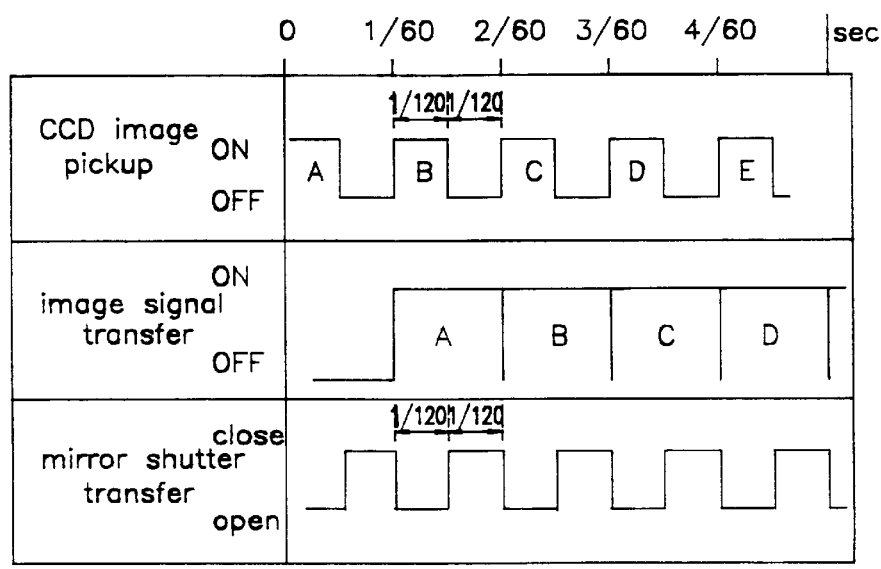

DEVICE FOR PREVENTING ENTRANCE OF BACKLIGHT INTO OPTICAL VIEW FINDER

BACKGROUND OF THE INVENTION

The present invention relates to an optical view finder in a camcorder, more particularly to a device for preventing entrance of backlight into an optical view finder, in which an image signal entered through a camera lens in a camera part is delivered in two directions by a mirror shutter part through a galvanometer, to the optical view finder and a CCD image sensor, one of which two directions of information is delivered through an intermediate lens system and an eye lens in the optical view finder to an observer's eye to observe an object, for preventing noises from backlights entering through the view finder.

In conventional view finder systems, there are, in view of the techniques, a type in which the view finder system is provided separate from a camera system, and the other type in which the view finder system is integral to the camera system, at large, of which integral view finder system is disclosed in detail in the Korean patent application, No. 94-22934, with a title "Device for preventing entrance of backlight into a zoom lens system having an optical view finder integrated thereto", which will be explained briefly hereinafter.

Of the view finder system integral to the camera system, an optical view finder of a TTL(through the lens) type, sharing a magnification varying system with the camera system includes an objective lens, a system of magnification varying lenses, and a system of compensating lenses arranged on the same optical axis in series, after which compensating lenses a beam splitter is provided to split the path of light into two. The beam splitter includes a reflecting surface for splitting incident light into two, to the same direction as the light proceeded and a direction at a right angle to the direction it proceeded, and a light axis which forms a light path as it was and the other light axis which forms the other light path at a right angle to the path as it proceeded. Behind the beam splitter, an iris for adjusting reception of light, a system of image forming lenses and a light receiving element of an image forming system, an objective lens and a system of intermediate lenses, and an eye lens, are provided, to form a view finder system.

On the other hand, a rear focus type zoom lens system, sharing a system of intermediate lenses and a system of image forming lenses in an image forming system provided in the zoom lens system with a view finder includes a magnification varying part having an objective lens with a positive refractive index at the very front of the light axis and a system of magnification varying lenses having a negative refractive index behind the objective lens for varying a length of focus of entire zoom lens system, an iris behind the magnification varying part, a system of intermediate lenses behind the iris for transmission of the image to final light forming system, and a system of image forming lenses behind the intermediate lenses, resulting to form four groups of a zoom lens system.

Behind the system of zoom lenses, a beam splitter having a reflection surface is provided for separating the light path into two paths in a certain ratio of illuminance, of which two light paths separated by the beam splitter, a light path on the same light axis with aforementioned systems of lenses has a light receiving element provided thereon to form a zoom lens system serving as a image forming system, and the other light path at a right angle to the above light axis has a total reflection mirror provided at an angle to be parallel to the reflection surface of the beam splitter, to form the light axis parallel. A field lens having a converging function is provided on the light axis, behind which a system of intermediate lenses is provided for correcting the image by means of an optical element so that the image finally has the same scale with the objective in vertical and horizontal directions, and adjusting the image to a size suitable to the observer's eye. Behind the system of intermediate lenses, an eye lens is provided for enlarging the final image.

However, in such a conventional view finder system, lights would enter into the view finder system from the view finder side which proceeds in the opposite order to the aforementioned operation order to reach to the system of zoom lenses by the beam splitter, which is then reflected at surfaces of different lenses as it travels to the objective and incident to the image sensor again, to overlap with the light started from the objective and entered into the system, causing degradation of contrast, or ghost or flare by the backlight.

Such a problem could have been solved in a rear focus type zoom lens system that has an integration of the camera system and the view finder system with an arrangement of lenses of, from the front of the lens system, the objective lens, the magnification varying lens, the intermediate lens, and the image forming lens, and the beam splitter arranged between a lens disposed at the last stage of the image forming lens and an image forming surface, by forming a film of a polarization separation coating on the reflection surface of the beam splitter that reflects an S-wave and transmits a P-wave. However, it can not block the backlight entering through the view finder, thoroughly.

A device for preventing entrance of backlight into the view finder integrated to the zoom lens system, in which information on an image entered through an objective lens is divided into two directions, one of which two directions of information is adapted to be observed through the view finder will be explained in further detail.

FIG. 1 is a schematic illustration for a conventional device for preventing entrance of backlight into an optical view finder.

As shown in FIG. 1, the conventional device for preventing entrance of backlight into an optical view finder includes a zoom lens part 1 for planning a picture by adjusting an angle and size of an image from an objective, an image separating prism part 3 for separating information on the image from the zoom lens part 1 into two by means of quantitative separation of the light, an image forming charge coupled device(CCD) part 5 disposed on an image forming plane of the image signal from the zoom lens part 1 for converting a part of formed image passed through the image separating prism part 3 into an electrical signal for transmitting it to a monitor or a recording medium, such as a tape, and an optical view finder part 7 disposed over the image separating prism part 3 for applying the other part of image signal passed through the image separating prism part 3 to an optical system and adjusting magnification, for allowing an observer's eye to watch it.

In the conventional device for preventing entrance of backlight into an optical view finder, having aforementioned system, an image signal from an objective is either stored in a memory device through the zoom lens part 1, the image separating prism part 3, the image forming CCD part 5 or displayed by a display as well as observed by an observer's eye through the optical view finder 7.

However, in case there presents a very bright external light, the conventional device for preventing entrance of backlight into an optical view finder has the external light entered into the zoom lens part taking an opposite course from the optical view finder part 7, and reflected at, such as lenses in the system and incident to the image forming CCD part 5, resulting to cause smear or strobe phenomena.

These phenomena, added to the original image signal, cause noises that form streaks on an taken image or make the image discontinuous. In order to eliminate these noises in conventional art, an electronic shutter is provided to the image separating prism part for shortening an image obtaining time period that depends on a speed of the electronic shutter, while strengthening intensity of the image signal with increased extent of opening of an iris, resulting to reduce a ratio of noise from the backlight coming through the view finder.

FIGS. 2A to 2C illustrate waveforms showing a signal transfer system of a conventional optical view finder, wherein FIG. 2A illustrates waveforms showing a CCD image pickup when an electronic shutter is not used, FIG. 2B illustrates waveforms showing the CCD image pickup when the electronic shutter($1/600$ seconds) is used, and FIG. 2C illustrates waveforms of a transferred signal in the signal transfer system.

As shown in FIG. 2A, the CCD camera system without the electronic shutter receives an image signal from the CCD in an $1/60$ second period, and the signal transfer system continuously transfers the signal to a display or a memory device an $1/60$ second period, but, as shown in FIG. 2B, the CCD camera system with the electronic shutter has one period of its CCD operation that the CCD obtains an image signal as long as the shutter opening time period(for example, for $1/600$ seconds for GS-EX1), and stops the operation until it comes to $1/60$ seconds. As shown in FIG. 2C, in this case the signal is transferred to the display or the memory device with a delay matched to $1/600$ seconds.

However, as the extent of opening of the iris becomes greater as the speed of the electronic shutter becomes faster, resulting to reduce a ratio of noise from the external backlight to the image signal, a threshold intensity of the backlight that can not be perceived with an observer's eye increases. Therefore, though a speed of the electronic shutter and the noise from backlight are inversely proportional, since the speed of the electronic shutter is also inversely proportional to a picture quality, the smear on the image becomes greater as the speed of the electronic shutter becomes faster.

The two division of the light received through the zoom lens part by the prism in the conventional type having aforementioned system causes the respective lights at the CCD and the optical view finder darker than entire received light. And, the prism, in one side, serves to direct the light from the zoom lens part to the optical view finder, but, in the other side, causes backlight from a strong light source, such as the sun or an electric light received through the optical view finder reflected toward the objective in the zoom lens part side.

In this time, since the backlight reflected at the objective is reflected at a surface of the objective lens to travel toward the prism again, a part of which backlight incident to the CCD to act as noises for the image formation, in spite of the electronic shutter provided in the image separating prism part, fundamental blocking of the backlight is not possible, even though a difference of the threshold intensity of the backlight that can not be sensed by the electronic shutter is made.

SUMMARY OF THE INVENTION

The object of the present invention designed for solving the foregoing problems is to provide a device for preventing entrance of backlight into an optical view finder, in which a thin mirror shutter part movable in up and down directions is provided instead of the iris blades of the galvanometer for sending an image signal coming from an objective through a zoom lens part to the optical view finder and an image forming CCD part by means of the opening and closing of the mirror shutter part, thereby to eliminate noises from the backlight coming from the optical view finder and to reduce light loss of the image.

In one aspect of the present invention, there is provided a device for preventing entrance of backlight into an optical view finder including a zoom lens part for adjusting a size and angle of an image signal of an objective in planning a picture frame, a mirror shutter part capable of opening and closing for sending the image signal processed in, and received from the zoom lens part to a first optical axis and a second optical axis, an image forming CCD part disposed at an image forming plane of the image signal of the zoom lens part on the first optical axis for converting the image formed on the first optical axis into an electric signal for applying the electric signal to a display or a recording medium, and an optical view finder part disposed on the second optical axis for adjusting a magnification of the image signal on the second optical axis by means of an internal optical system for being observed by an observer's eye.

BRIEF DESCRIPTION OF THE DRAWINGS

FIG. 1 is a schematic sectional illustration of a conventional device for preventing entrance of backlight into an optical view finder.

FIGS. 2A to 2C illustrate waveforms showing a signal transfer system of a conventional optical view finder, wherein FIG. 2A illustrates waveforms showing a CCD image pickup when an electronic shutter is not used, FIG. 2B illustrates waveforms showing the CCD image pickup when the electronic shutter($1/600$ seconds) is used, and FIG. 2C illustrates waveforms of a transferred signal in the signal transfer system.

FIG. 3 is a schematic sectional illustration of a device for preventing entrance of backlight into an optical view finder in accordance with on preferred embodiment of the present invention.

FIGS. 4A and 4B illustrate a mirror shutter part mounted on a galvanometer, wherein FIG. 4A illustrates a front view of the galvanometer, and FIG. 4B illustrates a side view of the galvanometer.

FIGS. 5A to 5C illustrate waveforms showing a signal transfer system of the optical view finder in accordance with the present invention, wherein FIG. 5A illustrates waveforms of a CCD image pickup, FIG. 5B illustrates waveforms of a transferred signal of the signal transfer system, and FIG. 5C illustrates waveforms showing operation periods of the mirror shutter part.

DETAILED DESCRIPTION OF THE PREFERRED EMBODIMENTS

A preferred embodiment of a device for preventing entrance to backlight into an optical view finder in accordance with the present invention will now be explained in detail with reference to the attached drawings.

FIG. 3 is a schematic sectional illustration of a device for preventing entrance of backlight into an optical view finder in accordance with on preferred embodiment of the present invention, and FIGS. 4A and 4B illustrate a mirror shutter part mounted on a galvanometer, wherein FIG. 4A illustrates a front view of the galvanometer, and FIG. 4B illustrates a side view of the galvanometer.

As shown in FIG. 4A, the mirror shutter part 9, which employs a principle of a galvanometer that opens and closes in very high speed in the instant when an image taking environment changes, includes a mirror 9A attached instead of a blade of the iris in the conventional galvanometer in the direction of movement of the blade, and a mirror controlling part 9B for controlling up and down movement of the mirror 9A in closing and opening of the mirror 9A in a certain period. In this time, the mirror shutter part 9, of its $1/60$ second operation period, opens the mirror 9A to deliver the signal from the zoom lens part 1 to the CCD part 5 for a half of the operation period of $1/120$ seconds and closes the mirror 9A to deliver the signal from the zoom lens part 1 to the view finder part 7 for the rest half of the operation period of $1/120$ seconds.

Referring to FIG. 3 and aforementioned system, the zoom lens part 1 serves to adjust an angle and size of an image of an object to plan a frame of picture, the mirror shutter part 9 serves to deliver the image signal planned in, and received from the zoom lens part 1 in two direction by means of its periodic opening and closing operations, and the image forming CCD part 5, disposed on an image forming plane of the image signal from the zoom lens part 1, serves to convert a part of the image formed on the CCD part 5 itself passed through the mirror shutter part 9 into an electrical signal and to deliver the electrical signal to a display or a recording medium, such as a tape.

And, the view finder part 7 transmits and adjusts a magnification of the other part of the image signal passed through the mirror shutter part 9 for an observer's eye to watch it.

FIGS. 5A to 5C illustrate waveforms showing a signal transfer system of the optical view finder in accordance with the present invention, wherein FIG. 5A illustrates waveforms of a CCD image pickup, FIG. 5B illustrates waveforms of a transferred signal of the signal transfer system, and FIG. 5C illustrates waveforms showing operation periods of the mirror shutter part.

First, for the $1/120$ seconds of an opened period of the mirror shutter part 9, the image signal from the objective passed through the zoom lens part 1, passes through the mirror shutter part 9, undergoes a photoelectric conversion through the image forming CCD part 5 into electrical image signal, and is presented to a display, and on the other hand, for the $1/120$ seconds of a closed period of the mirror shutter part 9, the image signal from the objective passed through the zoom lens part 1 is deflected at the mirror shutter part 9, and comes into an observer's eye through the optical view finder part 7.

In this time, of the $1/60$ seconds of the operation period of the mirror shutter part 9, the mirror 9A is opened for a half of the period of $1/120$ seconds to deliver the image signal of the objective from the zoom lens part 1 to the image forming CCD part 5, and is closed for the rest half of the period of $1/120$ seconds to deliver the image signal of the objective from the zoom lens part 1 to the optical view finder part 7.

That is, by devising the mirror shutter part 5 to be operated in periods in each of which periods the image forming CCD part 5 side is allowed to receive an image signal during the $1/120$ seconds when the mirror shutter part 9 is opened allowing to deliver the image signal to the image forming CCD part 5 side, and opposite to above, the image forming CCD part 5 side is stopped obtaining the image signal during the other $1/120$ seconds when the mirror shutter part 9 is closed allowing to deliver the image signal to the view finder part 7 side, an effect identical to that of the electronic shutter being operated in $1/120$ second period can be obtained.

As has been explained in detail, the device for preventing entrance of backlight into an optical view finder in accordance with the present invention has following advantages.

First, while the image pickup performance of the CCD can almost be favorably compared to a system without the electronic shutter, the influence from the backlight entering the optical view finder can be fundamentally eliminated.

Second, since the shutter speed of $1/120$ seconds is not a speed perceivable to a human eye, there is no problem in observing an objective through the optical view finder.

Third, in the present invention which does not employ a light dividing medium, the image signal received at the CCD has 100% of the light that was received at the zoom lens part, and the image observing through the optical view finder has also 100% of the light that was received at the zoom lens part, the problem of noise at image pickup due to entrance of backlight through the optical view finder, which has been a serious problem in the conventional light dividing type, and the problems of darkness due to loss of light of the image and flare from the eye lens of the optical view finder can be fundamentally solved.

Fourth, the present invention can make the best use of the merits of an optical view finder, such as high resolutions for all colors, low energy consumption without degradation of the image and a loss of lowest illuminance of an objective.

Accordingly, the device for preventing entrance of backlight into an optical view finder in accordance with the present invention can realize an optical view finder of high resolutions in all colors having merits only compared to a camcorder employing an existing view finder.

And, the device for preventing entrance of backlight into an optical view finder of the present invention is applicable to a device for preventing entrance of backlight into a zoom lens system integrated with an optical view finder, and can prevent smear or strobe phenomena that degrades a picture quality due to light entered into a camera system through a view finder.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the claims.

What is claimed is:

1. A camera device for preventing entrance of backlight into an optical view finder comprising;

a zoom lens part for adjusting a size and angle of an image signal of an objective in planning a picture frame;

a mirror shutter part movable in a rectilinear motion for sending the image signal processed in, and received from the zoom lens part to a first optical axis and a second optical axis;

said mirror shutter part includes a mirror attached thereto instead of a blade of a galvanometer and a mirror controlling part for controlling periodic opening and closing movement of the mirror;

an image forming CCD part, having no electronic shutter function, disposed at an image forming plane of the image signal of the zoom lens part on the first optical axis for converting the image formed on the first optical axis into an electric signal and for applying the electric signal to a display or a recording medium; and, an optical view finder part disposed on the second optical axis for adjusting a magnification of the image signal on the second optical axis by means of an internal optical system for being observed by an observer's eye;

wherein an operation period of the mirror shutter part is set to be 1/60 seconds, during a first duration of the 1/60 seconds, the mirror is opened for delivering 100% of the image signal from the zoom lens part to the image forming CCD part, and during a second duration of the 1/60 seconds, the mirror is closed to deflect 100% of the image signal from the zoom lens part to the optical view finder part.

2. The device as claimed in claim 1, wherein the first and second durations in the operation period of the mirror shutter part has a relation of the first duration+the second duration= 1/60 seconds.

3. A camera device for preventing entrance of backlight into an optical view finder comprising;

a zoom lens part for adjusting a size and angle of an image signal of an objective in planning a picture frame;

a mirror shutter part, continuously movable in a rectilinear motion, for sending the image signal processed in, and received from the zoom lens part to a first optical axis and a second optical axis;

said mirror shutter part includes a mirror attached thereto instead of a blade of a galvanometer and a mirror controlling part for controlling periodic opening and closing movement of the mirror;

an image forming CCD part, having no electronic shutter function disposed at an image forming plane of the image signal of the zoom lens part on the first optical axis for converting the image formed on the first optical axis into an electric signal and for applying the electric signal to a display or a recording medium; and, an optical view finder part disposed on the second optical axis for adjusting a magnification of the image signal on the second optical axis by means of an internal optical system for being observed by an observer's eye;

wherein an operation period of the mirror shutter part is set to be 1/60 seconds, during a first duration of the 1/60 seconds, the mirror is opened for delivering 100% of the image signal from the zoom lens part to the image forming CCD part, and during a second duration of the 1/60 seconds, the mirror is closed to deflect 100% of the image signal from the zoom lens part to the optical view finder part.

\* \* \* \* \*